United States Patent [19]
Kohnen

[11] Patent Number: 5,906,287
[45] Date of Patent: *May 25, 1999

[54] JUNCTION BOX CONSTRUCTION FOR USE IN CURVED STRUCTURES

[76] Inventor: Stephen J. Kohnen, 2160 Pyrenees, Florissant, Mo. 63033

[*] Notice: This patent is subject to a terminal disclaimer.

[21] Appl. No.: 08/699,051

[22] Filed: Aug. 21, 1996

Related U.S. Application Data

[63] Continuation-in-part of application No. 08/316,944, Oct. 3, 1994, Pat. No. 5,553,730.

[51] Int. Cl.$^6$ ....................................................... H02G 3/08
[52] U.S. Cl. .......................... 220/3.2; 220/3.3; 220/3.5; 220/3.8; 206/223
[58] Field of Search ........................... 206/223; 220/3.2, 220/3.3, 3.7, 3.8

[56] References Cited

U.S. PATENT DOCUMENTS

| | | | |
|---|---|---|---|
| D. 52,944 | 2/1919 | Boyton | D13/152 |
| D. 156,684 | 12/1949 | Stone | D13/152 |
| D. 160,441 | 10/1950 | Stone | D13/152 |
| D. 183,593 | 9/1958 | Atkin | D13/152 X |
| D. 185,057 | 5/1959 | Aktin | D13/152 X |
| 416,234 | 12/1889 | Perot . | |
| 1,735,331 | 11/1929 | Merrill | 220/3.6 |
| 1,883,457 | 10/1932 | Arnold . | |
| 2,181,740 | 11/1939 | Reiland | 72/105 |
| 3,083,856 | 4/1963 | Appleton | 220/3.2 |
| 4,176,758 | 12/1979 | Glick | 220/3.3 |
| 4,190,749 | 2/1980 | Erickson et al. | 206/223 X |
| 4,223,796 | 9/1980 | Silver | 220/3.7 X |
| 4,265,365 | 5/1981 | Boteler | 220/3.3 |
| 4,634,015 | 1/1987 | Taylor | 220/3.7 |
| 4,674,646 | 6/1987 | Teron | 220/3.4 |
| 4,744,462 | 5/1988 | Houseknecht | 206/223 |
| 4,794,207 | 12/1988 | Norberg et al. | 20/3.3 X |
| 5,042,673 | 8/1991 | McSchane | 220/3.7 |
| 5,272,279 | 12/1993 | Filshie | 220/3.2 X |
| 5,293,003 | 3/1994 | Praire, Jr. | 220/3.7 X |
| 5,316,164 | 5/1994 | Feuerlein et al. | 220/3.2 |
| 5,374,812 | 12/1994 | Chan et al. | 220/3.6 |
| 5,402,902 | 4/1995 | Bouley | 220/3.2 |
| 5,486,650 | 1/1996 | Yetter | 220/3.2 X |
| 5,553,730 | 9/1996 | Kohnen | 220/3.2 |

FOREIGN PATENT DOCUMENTS

| | | | |
|---|---|---|---|
| 686700 | 1/1953 | United Kingdom | 220/3.2 |
| 1283702 | 8/1972 | United Kingdom | 220/3.2 |

*Primary Examiner*—Sue A. Weaver
*Attorney, Agent, or Firm*—Haverstock, Garrett & Roberts

[57] ABSTRACT

A method and components for adapting a standard rectangular or other pre-existing junction box for mounting within cylindrical concrete piers and other curved structures commonly employed for supporting light poles and other mechanisms wherein the front wall portion of the adapted junction box and the face plate member associated therewith for controlling access to the interior portion of the junction box are both shaped and configured to conform to the specific curvature associated with the outer surface of the curved structure into which the adapted junction box will be mounted. The present components enable the adapted junction box to be completely embedded within the curved structure such that the exposed front wall portion thereof including the face plate member lie substantially flush with the outer surface of the curved retaining structure. Although a generally rectangularly shaped junction box can be easily adapted for substantially flush mounting within a curved structure, the present adapter components will likewise work equally as well with other junction box configurations including junction boxes having a curved front wall portion already associated therewith to produce an overall assembly having a front wall portion that is compatible with the curvature of the outer surface of the particular curved structure into which it will be encased. The present adaptation allows more convenient access to the interior portion of the junction box and provides a more weatherproof and tamperproof junction box as compared to the known square or rectangularly shaped junction boxes which are often times used in curved structure applications.

23 Claims, 5 Drawing Sheets

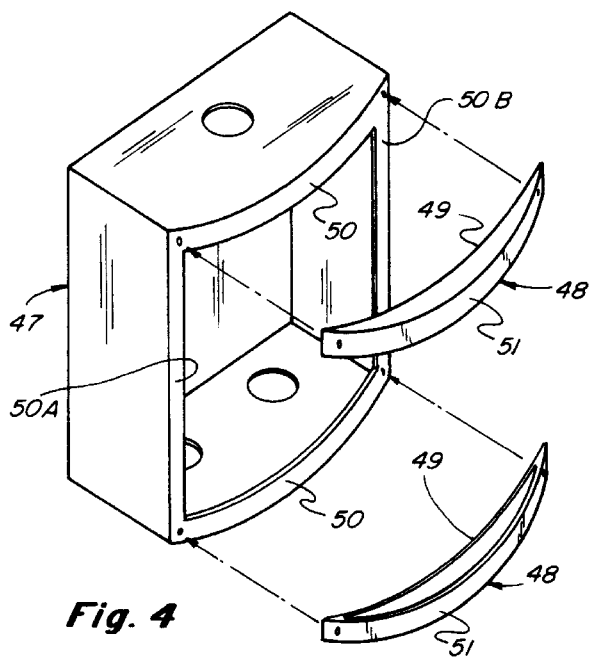
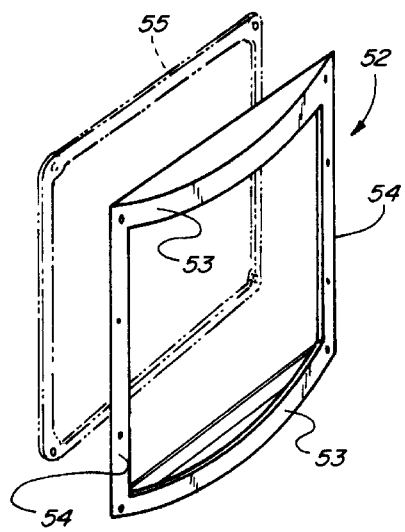
Fig. 4
Fig. 5
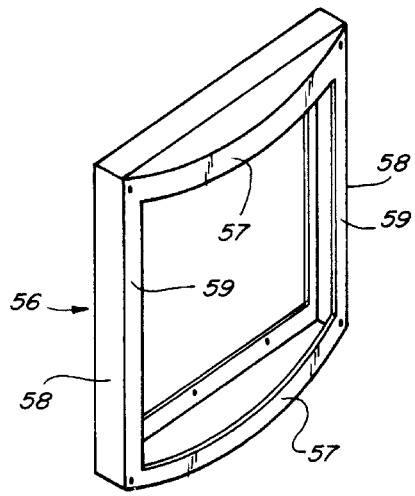
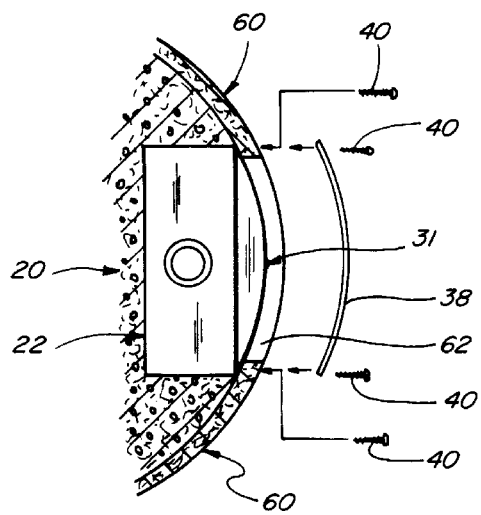
Fig. 6
Fig. 7
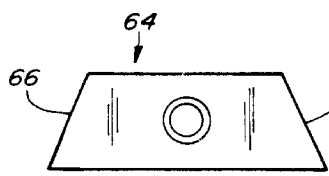
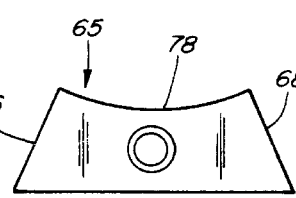
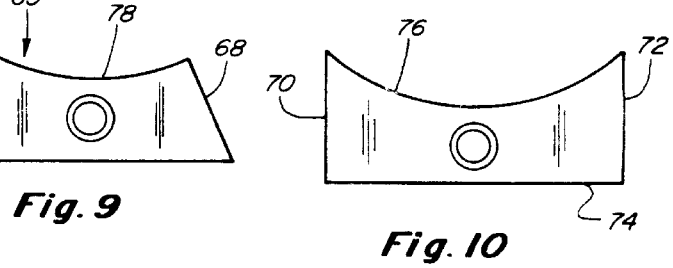
Fig. 8
Fig. 9
Fig. 10

JUNCTION BOX CONSTRUCTION FOR USE IN CURVED STRUCTURES

This application is a continuation-in-part of application Ser. No. 08/316,944, filed Oct. 3, 1994, now U.S. Pat. No. 5,553,730.

The present invention relates to means for adapting a standard rectangular or other pre-existing junction box for flush embedment within curved structures. More particularly, standard rectangular electrical junction boxes or other pre-existing junction boxes, such as junction boxes for controls for plumbing, gas, or other applications, may be adapted by means of curved adapter frame or adapter segment devices engaged with or attached to the front portion of the junction box to permit the embedded flush mounting of the assembled construction within cylindrical concrete piers or other curved structures, such as piers typically used for holding and supporting light poles and other structures that require electrical wiring and other electrical components to be associated therewith.

BACKGROUND OF THE INVENTION

Electrical junction boxes are generally formed as box-like structures, such as the known, standard rectangular, square, round, and octagonal shaped steel and PVC junction boxes commonly employed in many different applications, which applications often include the surface or flush mounting of such junction boxes on a planar wall, either interiorly or exteriorly. Significantly, a flush mounting within curved structures such as cylindrical concrete piers is not realizable with the standard junction boxes, and on those occasions when rectangular, square, round, or octagonal shaped junction boxes have been either attached to or encased within concrete piers, unique problems have arisen. For example, in such situations, installed standard junction boxes have sometimes been completely recessed within the curved structure so as to prevent any portion thereof from protruding beyond the outer surface of the curved structure. While this arrangement of the junction box within the curved retaining structure helps to prevent mechanical or environmental damage to the junction box, it also makes access to and work within the junction box more inconvenient and difficult. Alternatively, such junction boxes, or portions thereof, have been installed to protrude beyond the outer surface of the curved structure into which they are mounted, making access to and work within the boxes more convenient, but such arrangement leaves portions of the junction boxes more vulnerable to damage from external sources. The latter configuration is also less weatherproof and tamperproof than is generally desired. Thus, there is a need for means to adapt standard junction boxes for flush mounting in cylindrical or curved shaped structures of various sizes, such as in cylindrical concrete piers commonly used for supporting light poles and other structures.

Co-pending U.S. patent application Ser. No. 08/316,944, now U.S. Pat. No. 5,553,730, previously filed by this Applicant, discloses a junction box specifically configured for flush mounting within a curved structure, which junction box has a curvilinear or arcuate shaped front wall portion that is specifically designed to match the curvature of the curved structures, such as cylindrical concrete piers. That junction box construction is intended to replace the conventional rectangular and/or square shaped junction boxes for mounting applications within a curved structure. While such a construction is quite advantageous, the plethora of differently sized curved structures with which the junction boxes may be employed results in a need to keep an inventory of junction boxes that have different front wall curvatures. Keeping a large inventory of different junction boxes, however, can be costly and can require significant storage space.

Until now, there has been no known means for adapting a conventional or standard junction box for flush mounting within a curved structured or for adapting a junction box having an arcuate shaped front wall portion for flush mounting within a curved structure that has a curvature different from that of the curved junction box. Although many of the known prior art devices, including the devices disclosed in co-pending U.S. application Ser. No. 08/316,944, now U.S. Pat. No. 5,553,730 have different box-like shapes, no known prior art devices have included means for making standard non-curvilinear or non-arcuate shaped junction boxes compatible for ready use in a wide variety of differently curved structures, such as cylindrical concrete piers. Consequently, for these and other reasons, the constructions of this application offer significant advantages in applications where it is desirable to adapt a pre-existing or standard junction box for flush mounting within a curved structure, especially since they permit the advantages realized by the junction boxes of co-pending application Ser. No. 08/316,944 now U.S. Pat. No. 5,553,730 to be realized while also minimizing the need for extensive additional inventory of junction boxes.

SUMMARY OF THE INVENTION

The present invention teaches the construction and use of several devices for adapting a standard rectangular or other pre-existing junction box for flush mounting within a curved structure. A separate adapter frame device or separate adapter segment devices, each of which devices is engageable with the standard junction box to project frontwardly therefrom and includes a front surface portion that is curved to correspond to the curvature of the retaining structure into which the junction box is to be mounted, is provided. A curved face plate member may also be provided, the face plate member being abuttably engageable with the adapter devices and likewise formed so as to have the same curvature as the curved structure into which the junction box is mounted.

A standard rectangular junction box typically comprises a housing including a planar rear wall, vertically planar side walls extending from the rear wall, and horizontally planar top and bottom walls interconnecting the rear and side walls and extending therebetween. The front portion of the housing member is substantially open but does include a front portion that extends around the perimeter thereof to define a lip and/or flange portion, sometimes with associated connector tabs. The curved adapter frame device or adapter segment devices include front and rear portions, the rear portion of each being matably engageable with the standard junction box. Typically, the adapter frame device or adapter segment devices may include a rear surface portion that may be placed in abutment with a flat front flange portion of the rectangular junction box housing at selected locations thereon for attachment thereto, such as through the use of any suitable fastening means such as, for example, rivets, nuts and bolts, fold over tabs, fasteners including snap-lock fasteners, cement, glue, welding and/or other fusion or bonding methods. The front portion of each adapter device may typically include a front surface which is curved or arcuate in shape to conform to the curvature of the structure in which the junction box will be mounted. This construction is advantageous over previously known constructions in that it enables a standard rectangular junction box housing to be used within a wide variety of curved structures by the simple expedient of attaching appropriately curved adapter frame or adapter segment devices to the front portion of the standard junction box housing and by installing the resulting construction in the curved structure. Depending upon the fastening means used, the same standard junction box can be re-configured with other frame or curved segment devices having different curvatures in the event of a change in requirements or application. This saves inventory space and cost in that a user need not stock a multitude of differently curved junction boxes, but, instead, need only stock standard rectangularly shaped junction boxes which can be used in both conventional applications and, with adapter devices, in curved structures as explained herein, and a variety of adapter devices of different curvatures.

Face plate members may also be shaped to be readily attached by suitable means to the curved frame or segment devices so as to form a front wall surface that totally encloses the cavity or space formed within the junction box, and preferably include a gasket type seal on the inner side portion thereof. Apertures through any of the wall members forming the standard junction box, and/or the face plate member, can be provided for receiving wire leads, conduit, or piping therethrough for attachment or connection purposes. An access panel may also be provided in the face plate member to facilitate access to the contents of the junction box without removing the entire face plate member. The adapter components, whether consisting of a curved frame device or one or more curved segment devices, with or without the associated curved face plate member, may be provided in assembly kit form, and may include means for fastening the components to the junction box housing as well as to a correspondingly curved face plate member.

The present components are therefore designed to adapt standard rectangular or other pre-existing junction boxes for compatible use with cylindrical concrete piers and other curved structures that require electrical wiring or other electrical controls, or controls for plumbing, gas, or other applications, and connections to be associated therewith to effect a desired result. Embedding the junction box assembly, with adapter devices, within a cylindrically poured concrete structure can be accomplished in a manner similar to that described in co-pending U.S. application Ser. No. 08/316,944, now U.S. Pat. No. 5,553,730 or by positioning the junction box assembly, that is, a standard junction box with the adapter frame or adapter segment devices attached thereto, behind a cutout formed in a sonotube form commonly used to form up such curved structures or piers prior to pouring the concrete, positioning the face plate member so that it overlaps the sonotube cutout on the exterior thereof, and fastening the face plate member to the adapter segment devices of the front of the junction box assembly. Various connection or engagement techniques can be employed, including spring clamping and snap-lock techniques, in addition to other standard connection techniques. This latter installation method, as described hereinabove, sandwiches the sonotube form between the face plate member and the junction box and holds the entire junction box assembly firmly in place while the concrete is poured. Such method eliminates the necessity for drilling multiple mounting holes through the sonotube form and thereby speeds installation. These installation methods result in a substantially flush mating of the front wall portion of the junction box assembly with the curved concrete structure. Conduit or other wiring or piping connections can likewise be attached to the junction box, as required, prior to pouring the concrete. Subsequently, after the concrete has hardened, the face plate member can be unfastened and the sonotube form can be removed, leaving the concrete pier or other curved structure with the junction box assembly and conduit or other electrical, plumbing, or control components embedded therein.

Although it is preferred that the housing member be a standard rectangular junction box, it is recognized and anticipated that the rear, front, and side walls associated with the junction box may take on a wide variety of other shapes and angular orientations, and the box itself, as well as the adapter devices, may be constructed of various suitable materials, such as steel, PVC, or other materials. An important aspect of the present invention is the fact that the curved adapter frame or adapter segment devices and the face plate member are all shaped so as to conform to the curvature of the outer surface of the particular structure into which the junction box assembly will be embedded when such components are attached to or matably engaged with the particular standard junction box being used. Several embodiments of the present invention illustrating possible variations are disclosed and discussed hereinafter. Thus, when a standard junction box is embedded within a cylindrical concrete pier or other curved structure and the curved adapter or frame or adapter segment devices and the curved face plate member are attached thereto in accordance with the teachings of the present invention, the exposed face plate member will lie substantially flush with the curved structure's exterior surface. This arrangement permits the advantages sought for the junction box in co-pending application Ser. No. 08/316,944 now U.S. Pat. No. 5,553,730 to be realized while permitting the use of standard junction boxes, in association with appropriate adapter devices, thereby reducing stocking and inventory cost.

It is therefore a principal object of the present invention to provide means to adapt standard junction boxes for flush mounting within cylindrical concrete piers and other curved structures.

Other objects and advantages of the present invention will become apparent to those skilled in the art after considering the following detailed specification in conjunction with the accompanying drawings.

Although, for purposes of discussion and illustration, reference is hereinafter made to an electrical junction box and to electrical wiring and conduit, it should be recognized that the junction box could also be described in terms of plumbing or other applications and with regard to piping or other types of conduit and with regard to various types of controls or connection applications.

BRIEF DESCRIPTION OF THE DRAWINGS

FIG. 4 is a perspective view of another embodiment of the present adapter means wherein curved segments are attached to a junction box having a curved front wall portion so as to adapt the junction box to a curved structure having a different radius of curvature than the one for which the junction box was originally designed;

FIG. 5 is a perspective view showing two of the present curved segments incorporated within a frame member that may be fastened to a junction box, a gasket type seal member being likewise shown in position for operative engagement between the frame member and the front portion of a junction box;

FIG. 6 is a perspective view of another embodiment of the present curved segment members incorporated within a frame member that may be attached to a junction box to extend the depth of such junction box;

FIG. 7 is a top plan view of a typical rectangular junction box utilizing the present adapter means positioned within a sonotube form, the junction box assembly being held in place prior to the concrete pouring by fastening the face plate member via holes in the sonotube form to the front wall portion of the junction box assembly;

FIG. 8 is a top plan view of another junction box construction showing an alternate housing wall configuration;

FIG. 9 is a top plan view of still another junction box construction showing another alternate housing wall configuration;

FIG. 10 is a top plan view of a still further junction box construction showing still another housing wall configuration;

DETAILED DESCRIPTION OF THE PREFERRED EMBODIMENT

Figure 1:
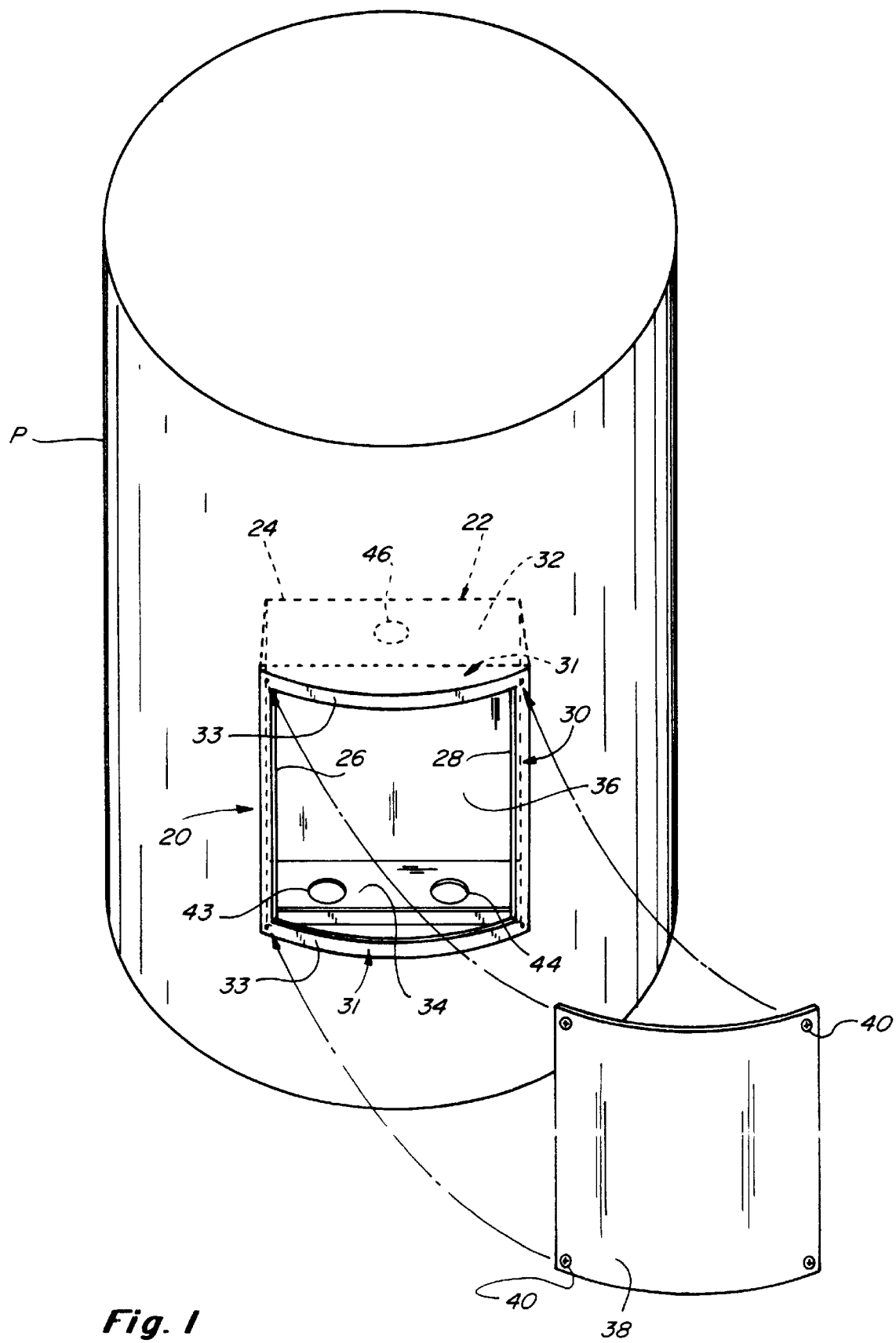
FIG. 1 is an exploded perspective view of a preferred embodiment of an electrical junction box assembly adapted according to the teachings of the present invention for use in a curved structure showing the housing member with curved segments attached to the top and bottom of the front wall portion thereof in operative position within a typical cylindrical structure and further showing the present face plate member positioned for cooperative engagement with the front portion of the junction box assembly.
Figure 2:
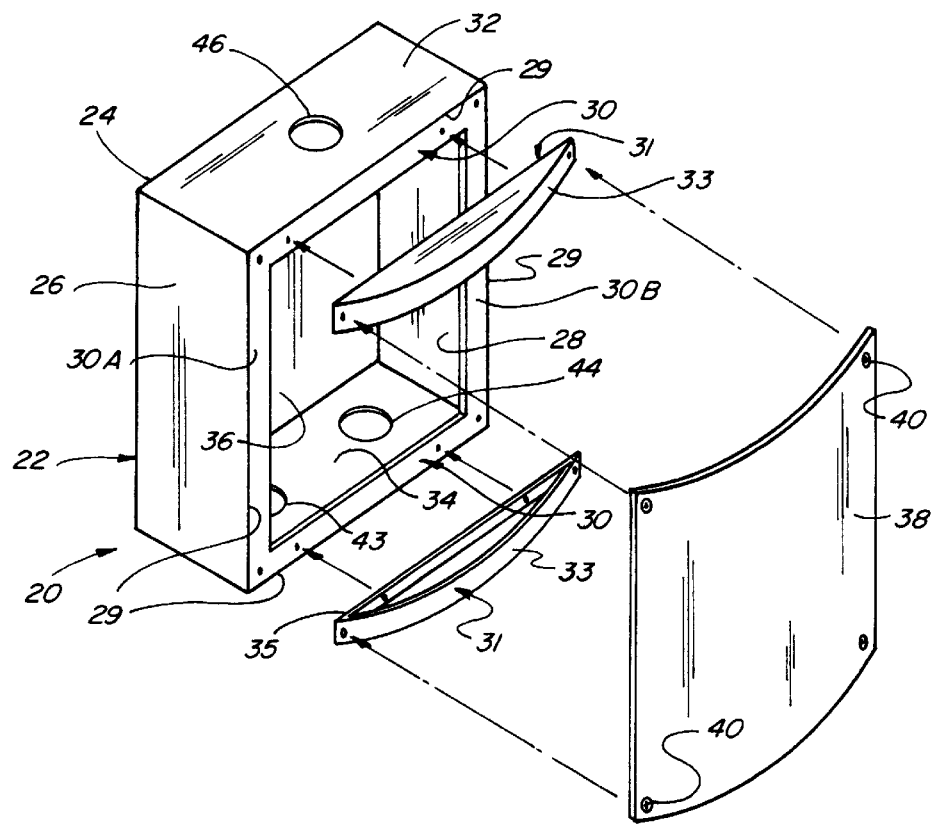
FIG. 2 is another exploded perspective view of a typical rectangular electrical junction box and the present adapter means similar to FIG. 1 without reference to a typical cylindrical structure.

Referring to the drawings more particularly by reference numbers wherein like numerals refer to like parts, number 20 in FIGS. 1 and 2 identifies a typical rectangular electrical junction box adapted for mounting within a curved structure according to the teachings of the present invention. FIG. 1 shows the junction box assembly 20 installed in a cylindrical concrete pier P. The junction box assembly 20 comprises a standard rectangular junction box housing member 22 which includes a rear wall portion 24, spaced side wall portions 26 and 28, a front lip 29 which includes a flange portion 30, spaced top and bottom wall portions 32 and 34 extending the full length and depth of the housing member 22 between the front, rear and side wall portions thereof as shown in FIGS. 1 and 2, and a pair of curved segment members 31 attached to the front lip 29 which includes a flange portion 30 at selected locations as shown. The lip 29 and flange portion 30 extend peripherally around the front edge portion of the housing member 22 and, in this particular application, the curved segments 31 are attached respectively to the top and bottom surface of the front flange portion 30 as illustrated. The front wall or surface portion 33 of each of the curved segments 31 includes a radius of curvature substantially equal to that of the curved structure P into which the entire junction box assembly 20 will be mounted. The curved segments 31 further provide a mating surface for attachment of the present face plate member 38 as will be hereinafter explained.

The housing wall members 24, 26, 28, 30, 32 and 34 define a substantially enclosed space 36 which forms the interior portion of the junction box assembly 20 wherein electrical connections and/or controls can be housed and accessed. This space 36 is easily accessed through the front flange portion 30 of the housing member 22 as illustrated in FIGS. 1 and 2 and is completely enclosed when the face plate member 38 is attached to the junction box assembly 20 as indicated in FIG. 2. In fact, the present curved segments 31, when attached to the front flange portion 30 of the housing member 22, actually extend the usable space 36 within the assembly 20 by the dimensions of the curved members 31. Conduit, conductors or other components may extend into the electrical junction box assembly 20 through any number of apertures or knockouts that can be located, where desired, on any of the wall portions associated with the housing member 22 such as the apertures 43, 44 and 46 illustrated in FIGS. 1 and 2. These apertures can be provided through any of the wall portions including the side wall portions 26 and 28 for attachment to conduit and/or for receiving wiring leads depending upon the particular application. Any aperture that remains open after conduit, wiring or other components have been installed within the space 36 may be plugged or sealed so that excess concrete or other construction materials do not leak into the housing member 22 during the casting process.

The curvature of the convex front wall portion 33 of each of the curved segments 31 is fashioned so as to correspond to the curvature of the outer surface of the curved structure or cylindrical pier P as shown in FIG. 1. It is important to attach the curved segments 31 to the top and bottom portions of the front flange portion 30 of the housing member 22 as best illustrated in FIG. 2 before mounting the entire assembly 20 within the cylindrical or curved structure P so that the junction box assembly 20 will be substantially flush with the exterior surface of the curved structure into which it is embedded as illustrated in FIG. 1. The curved segments 31 may be attached to the front flange portion 30 by using any suitable fastening means including, without limitation, screws, nuts and bolts, rivets, fold over tabs, snaplock fasteners, welding, bonding cement, glue, or other suitable means. By making the curved segments 31 attachable to standard rectangular junction boxes, inventory requirements are substantially reduced since only the rectangular junction boxes and the curved segments such as the members 31 need be stocked instead of stocking both planar and curved-front junction boxes. A further advantage is that, in the event of a change in the curvature of the mounting structure, a different curved segment may be selected for attachment to the same housing member 22 rather than scraping the previously fashioned curved unit and constructing a totally new curved junction box as would be required with a junction box constructed according to the teachings of the co-pending U.S. application Ser. No. 08/316,944 now U.S. Pat. No. 5,553,730.

With respect to the housing member 22, flange portion 30 is preferably dimensioned so that at least a portion of the curved segment member 31 may be attached or otherwise fastened to it. In the embodiment shown in FIG. 2, the front flange portion 30 is substantially planar and the curved segments 31 include a substantially flat rear wall 35 that is shaped and dimensioned to lie substantially flush with the top and bottom surface portions of the front flange portion 30 thereby facilitating attachment thereto. The curved segments 31 are attachable to the top and bottom of the front portion 30 by suitable means as previously explained to form an enclosure with the housing structure 22 when the face plate member 38 is attached thereto.

Figure 3:
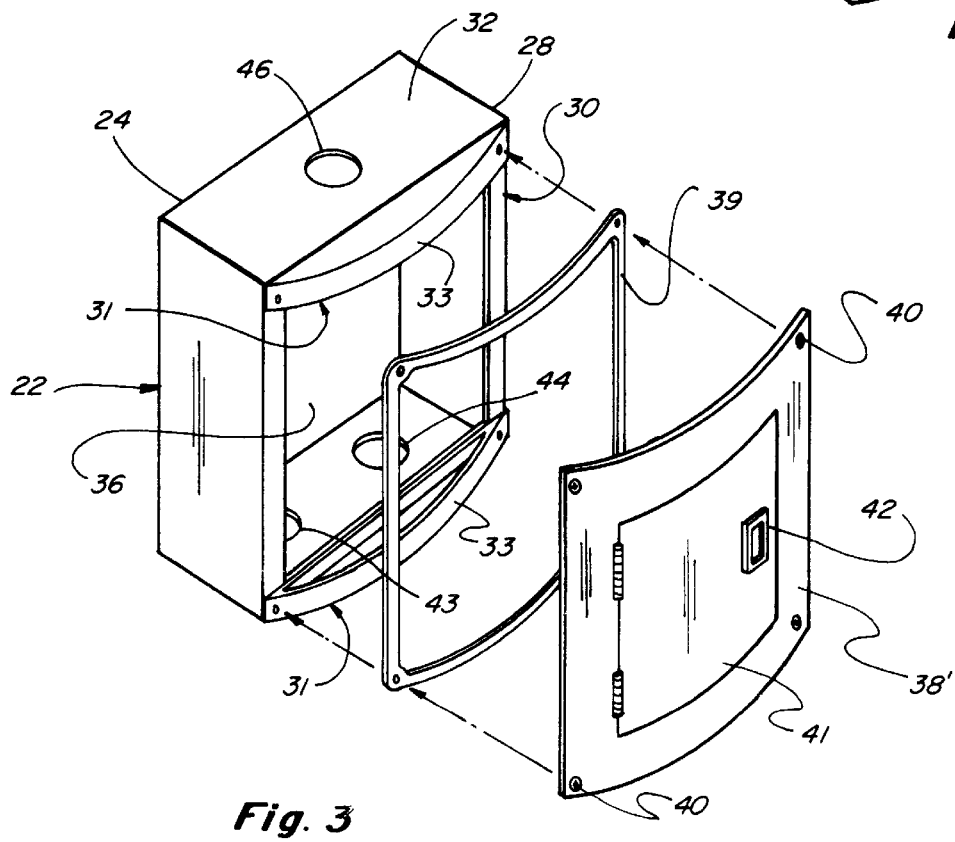
FIG. 3 is an exploded perspective view of the junction box assembly of FIG. 2 showing a gasket type seal member positioned for operative engagement between the face plate member and the front portion of the junction box assembly as well as an access panel associated with the face plate member.

The face plate member 38 is likewise convex or otherwise curved or rounded to correspond to the radius of curvature associated with the curved segment members 31, and, accordingly, to the curvature of the outer surface of the retaining structure P. The face plate member 38 also preferably includes a gasket type seal member 39, as shown in FIG. 3, on the inner side portion thereof and is adapted to be attached by any suitable attachment means to at least a portion of the front flange portion 30 as well as the curved segments 31 such as by the fastener means 40. When attached to the front flange portion 30 and the curved segments 31, the gasket seal 39 located on the concave side of the face plate member forms a tight weatherproof seal therebetween thereby further protecting the contents of the junction box assembly 20 from deterioration and other problems associated with exposure to the elements. Likewise, since the junction box assembly 20 is recessed within the curved structure P, it provides greater protection to the contents thereof and greatly decreases its exposure to damage from a wide variety of other external sources, including unwanted tampering. The fastener means 40 may be such that they are not easily removable to further deter unwanted tampering, in which case an access panel such as the panel member 41 associated with face plate member 38' (FIG. 3) may be provided in the face plate member to allow entry into the inner portion of the junction box assembly 20 and the wires and other components located therein. The access panel 41 may also include security means such as a lock mechanism 42 to prevent unauthorized access and such panel 41 may be pivotally attached as shown in FIG. 3 for easy access to the enclosed space 36.

Another anticipated embodiment as shown in FIG. 4 includes a junction box 47 with a curved front portion constructed according to the teachings of co-pending U.S. application Ser. No. 08/316,944, now U.S. Pat. No. 5,553,730, with curved segments 48 attached thereto to adapt the preconstructed junction box 47 to a structure having a different curvature than the one for which the junction box 47 was originally designed. In this case, as shown in FIG. 4, each of the curved segments 48 includes an inner concave rear surface portion 49 which is formed to lie substantially flush with the curved front wall portions 50 of junction box 47 when positioned thereagainst, and an outer convex front surface portion 51 which is shaped so as to conform to the curvature of the outer surface of the curved retaining structure when the entire junction box assembly is embedded in the retaining structure. The curvature of the concave rear portion 49 of each of the segment members 48 corresponds to the curvature of the front wall junction box portions 50 whereas the curvature of the convex front portion 51 of each of the segment members 48 corresponds to the curvature of the outer surface of the curved retaining structure such as the cylindrical concrete pier P illustrated in FIG. 1. The curved members 48 may be attached to the curved front wall portions 50 of the junction box 47 by using any suitable means similar to the attachment of curved members 31 to selected portions of the front flange portion 30 of housing member 22.

Referring again to FIG. 2, when the curved segments 31 are attached to the housing member 22, the exposed side portions 30A and 30B of the front flange portion 30 remain substantially planar as illustrated. Thus, when the face plate member 38 is attached to the curved segments 31, only the edges of the side portions 30A and 30B come into contact with the face plate member 38. In situations where a weatherproof seal is important, increased surface contact between the side portions 30A and 30B and the face plate member 38 may be necessary to properly retain the weatherproof gasket. When this situation arises, a frame member 52 as shown in FIG. 5 may be utilized for attachment to the housing to provide a better seal between the respective mating surfaces. The frame member 52 includes two curved segments 53 and two curved or slanted side frame portions 54. The curved segments 53 can be constructed along the same lines as the members 31 or 48 depending upon the construction of the particular junction box being utilized. The slanted or curved side frame portions 54 are likewise similarly curved so as to conform to the curvature of the segments 53 and such side portions will provide increased contact with the side edge portions of the face plate member when positioned thereagainst thereby presenting more surface area for retaining a weatherproof gasket such as the gasket member 39. It is also important to recognize that the frame member 52 may be constructed so as to be utilized with any junction box such as the junction box housings 22 and 47 as previously indicated. In the case of housing 22, the side frame portions 54 are constructed so as to mate and lie flush with the housing side portions 30A and 30B whereas in the case of housing 47, the side frame portions 54 are constructed to mate and lie flush with the housing side portions 50A and 50B. Still further, an additional gasket member such as the gasket member 55 illustrated in FIG. 5 may be positioned and attached between the front wall portion of the junction box housing and the frame member 52 to provide still greater protection from the elements.

FIG. 6 illustrates yet another embodiment of a frame member 56 incorporating curved segments 57 and side extension panels 58, such frame member being shaped to increase the depth of the overall junction box assembly. By attaching a frame assembly such as frame member 56 to a standard junction box, added space becomes available within the housing for additional wiring or other materials for which there may otherwise be insufficient space. The side extension panels 58 may also include a curved or slanted section 59 toward the front portion thereof for increased surface contact with a face plate member attached thereto such as the face plate members 38 and 38' illustrated in FIGS. 2 and 3. The frame member 56 may be comprised of multiple components fastened together by suitable means or, alternatively, the frame member 56 may be formed by any molding or forming process that produces a one-piece construction.

It is anticipated that the various present components for adapting a standard rectangular or other pre-existing junction box for flush mounting within a curved structure may be packaged in assembly kits and provided to customers who require the advantages of a junction box that is shaped to achieve a flush mount within a curved structure. The kits consisting of various combinations of the present components such as the frame members 52 and 56 as illustrated in FIGS. 5 and 6, or the curved segments 31 and 48 as shown in FIGS. 2 and 4, and/or the face plate members 38 and 38', along with means for attaching the right combination of such members to the junction box assembly would be particularly useful where a customer has an existing supply of standard rectangular or curved-face junction boxes, and a requirement for installing them within a wide variety of curved structures. The kits would include suitable instructions so that any non-skilled person, with minimum tool requirements, could easily adapt an existing junction box for mounting in a curved retaining structure.

The present means for adapting a junction box for use within curved structures is specifically designed to facilitate casting within a cylindrical concrete pier or other curved structure and allow the junction box assembly to be easily positioned and retained in its proper location during the forming process as shown in FIG. 7. In this regard, the junction box assembly 20 can be easily inserted through and positioned adjacent to a cutout 62 located in a sonotube form 60, which sonotube forms are typically used in forming a wide variety of different types of concrete piers that are used in a multitude of different applications such as a base for light poles and other structures. The junction box assembly 20 can be positioned and supported in its desired location using the arrangement shown in FIG. 7 or other means sufficient to keep the overall junction box assembly 20 stable and steady during the pouring process. As shown in FIG. 7, the junction box assembly 20 includes a pair of curved segments such as the segments 31 attached to a typical rectangular electrical junction box such as the junction box 22 and the entire assembly 20 is secured within the sonotube form 60 prior to the actual pouring of any concrete by positioning the assembly 20 inside of the form 60 and adjacent to the cutout 62 as illustrated and thereafter positioning the face plate member 38 over the cutout 62 on the outer surface of the sonotube form 60. The face plate member 38 is then fastened to the junction box assembly 20 using fastening means, such as the threaded fasteners 40, which are threadedly positioned through aligned holes located in the face plate member 38, the sonotube form 60, the curved segments 31, and/or the front wall side portions 30A and 30B of the housing member 22. In the case where the frame member 52 or 56 is utilized to form the junction box assembly 20 of FIG. 7, the aligned holes are drilled or otherwise formed around the outside periphery of such frame member. Once the face plate member 38 is secured to the assembly 20, a portion of the sonotube form 60 is sandwiched therebetween and provides sufficient rigidity and stability to hold the assembly 20 in proper position during the casting process. Once the concrete material is cured and set, the junction box assembly 20 will be firmly embedded therewithin. Conduit, wiring and/or other controls for plumbing, gas or other applications can be attached to the junction box assembly 20, as required, prior to the pouring process and such installation would also help prevent the junction box assembly 20 from becoming dislodged from its encasement. Subsequently, the face plate member 38 can be unfastened and the sonotube form 60 can be removed, leaving the concrete pier with the junction box assembly 20 and conduit/wiring/controls encased therein. As an additional precaution, means such as tabs, flanges or ridges may also be employed on the top, bottom and/or side walls of the junction box assembly 20 to further prevent such assembly from being moved or otherwise dislodged from its proper position.

Although the shape and configuration of the housing member 22 illustrated in FIGS. 1 and 2 is most generally used, it is important to recognize that the present means for adapting a conventional rectangular or other pre-existing junction box housing for mounting within a curved structure can be utilized on junction boxes fashioned into a variety of other sizes and shapes without impairing the teachings and practice of the present construction. For example, the planar side walls 66 and 68 associated with the housing embodiments 64 and 65 illustrated in FIGS. 8 and 9 may be angled inwardly as shown, or, as illustrated in FIG. 10, the side walls 70 and 72 may extend in a substantially parallel direction relative to each other between the front and rear wall portions 74 and 76. The substantially planar rear wall portion 24 associated with housing 22 as illustrated in FIGS. 1 and 2 may alternatively be formed by a curved rear wall 76 or 78 as shown in FIGS. 9 and 10. The rear and side wall portions of the housing member may take on still other shapes not illustrated herein which will likewise be compatible for use with the particular installation involved. Irrespective of the particular shape and configuration of the front, rear and opposed side wall portions associated with the housing member, it is important that the curved segments 31 and 48 as well as the face plate members 38 and 38' be curved so as to mount flush or nearly flush with the curved surface of the encasing structure as best illustrated in FIGS. 1 and 7.

Figure 11:
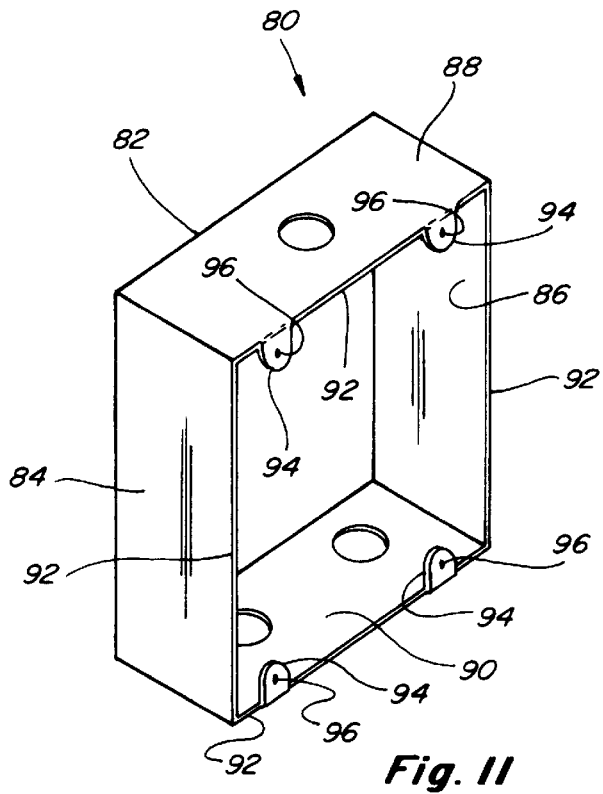
FIG. 11 is a perspective view of another typical junction box construction which may be utilized in conjunction with the present adapter means.

FIGS. 11–14 illustrate still additional uses and embodiments of the present adapter means in conjunction with conventional junction box assemblies wherein no front flange portions such as the flange portions 30 and 50 associated with housings 22 and 47 (FIGS. 2–4) are incorporated into the particular junction box to be adapted for flush mounting in a cylindrical or curved shaped structure. More particularly, the junction box 80 illustrated in FIG. 11 includes a rear wall portion 82, spaced side wall portions 84 and 86, spaced top and bottom wall portions 88 and 90 extending the full length and depth of the junction box 80 between the rear and side wall portions thereof, a front lip or edge portion 92 which extends around the entire front periphery of the junction box 80, and a plurality of tabs or flange portions 94 which are positioned at selected locations along the front lip 92 so as to extend inwardly towards the center of the junction box 80 as illustrated in FIG. 11. In this particular embodiment, a pair of tab members 94 are associated with the front lip 92 of each of the top and bottom wall portions 88 and 90 as illustrated. Each of the tab members 94 includes an opening or aperture 96 for receiving a threaded member therethrough and such tab members 94 are specifically provided as means for attaching the curved segments of the present invention such as the segments 31 and 48 to the top and bottom edge portions 92 of the junction box 80. In this regard, the curved segments such as the segments 31 are attached respectively to the top and bottom edge portions 92 of wall portions 88 and 90 by positioning suitable fastening means through the apertures 96 located in each of the tab members 94, and through aligned apertures located through the rear wall portion of each of the curved segments and thereafter securing the same. Since the junction box 80 does not include a front flange portion such as the flange portion 30 illustrated in FIGS. 2 and 3, the tab members 94 provide the necessary means for securely attaching the curved segments of the present invention to the top and bottom front lip portions of a typical junction box 80. Once the curved segments of the present invention are suitably secured to the junction box 80, all other components of the present invention such as the face plate members 38 and 38' and the gasket member 39 illustrated in FIGS. 2 and 3 can be positioned and attached as previously described. It is also important to recognize that the position and location of the respective tab members 94 and well as the total number of such members may vary from one application to another, the only requirement being that a sufficient number of such tab members be utilized as to properly secure and stabilize the respective curved segments to the junction box 80.

Figure 12:
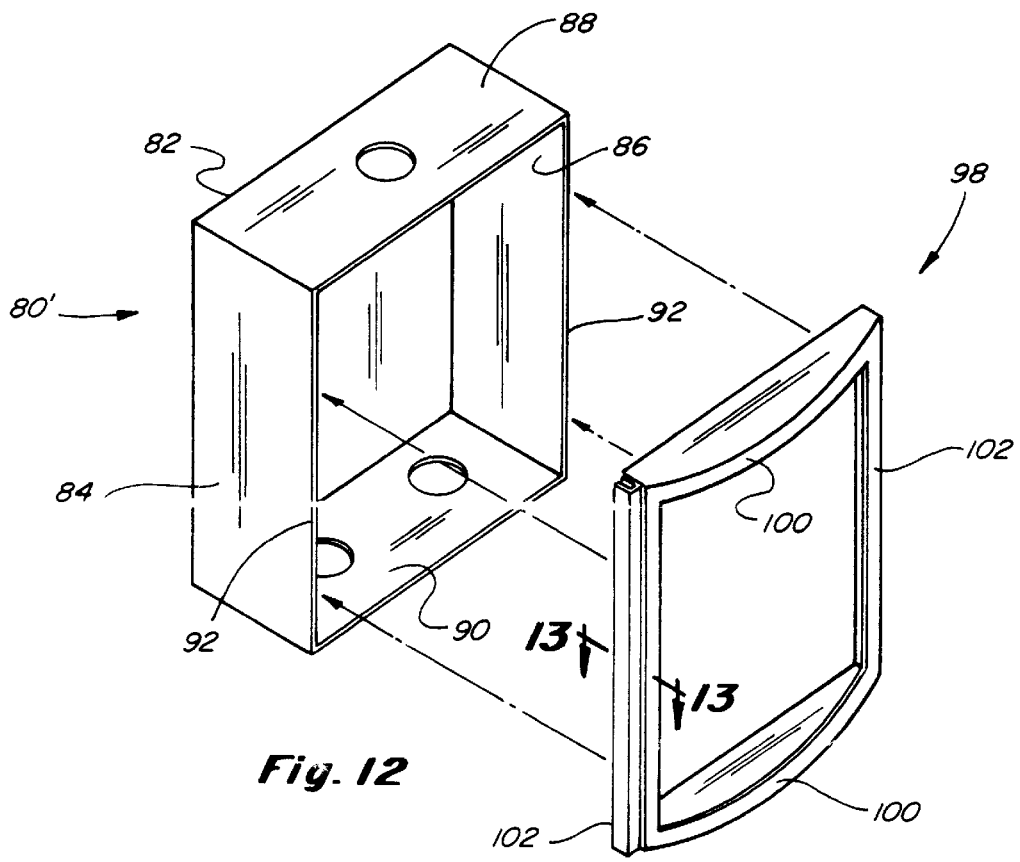
FIG. 12 is an exploded perspective view of another junction box assembly utilizing still another embodiment of a frame member incorporating the present adapter means.
Figure 15:
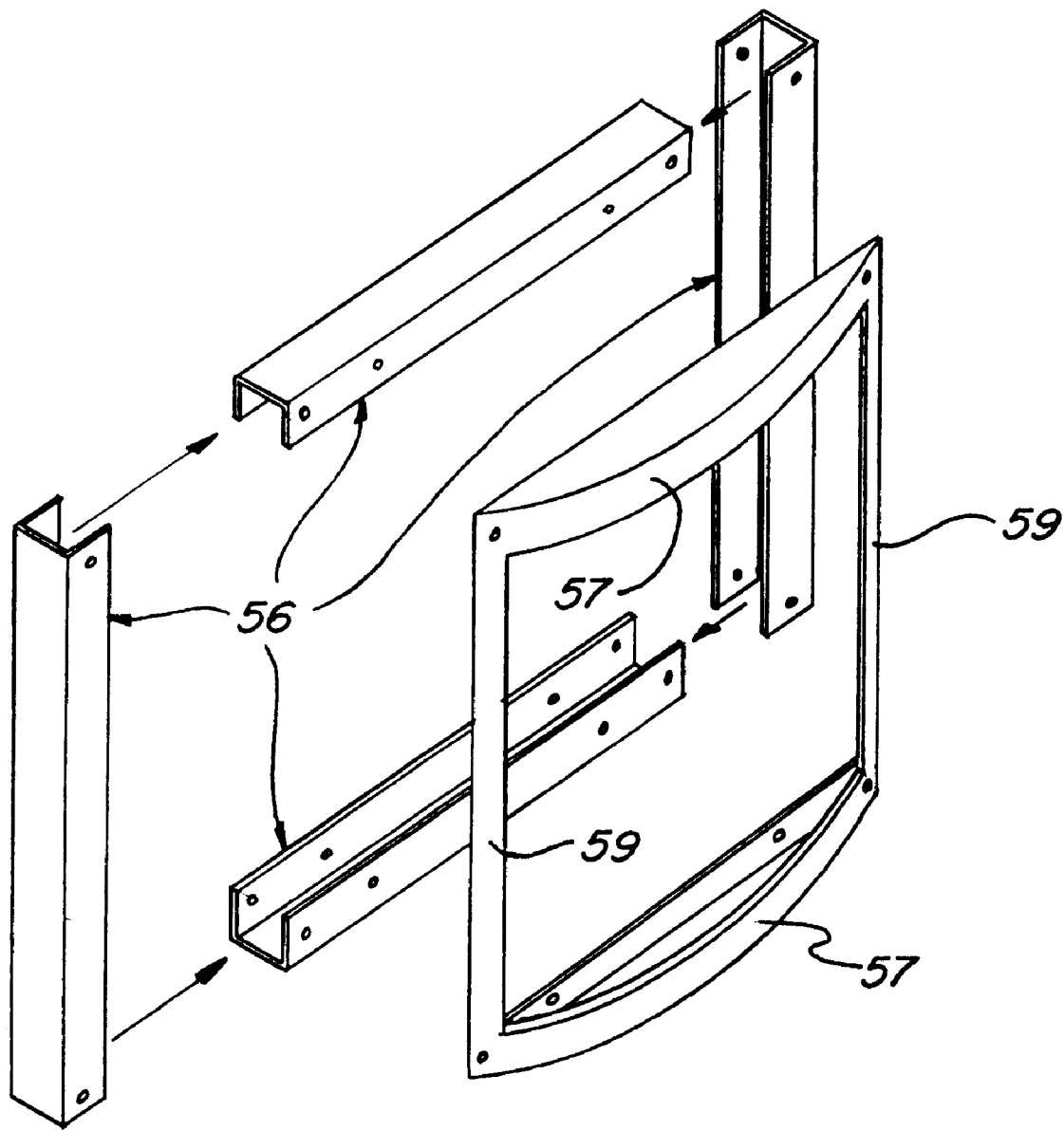
FIG. 15 is an exploded perspective view, generally similar to FIG. 6, but showing a frame as assembled from separable component parts.

FIG. 12 illustrates still another embodiment of a frame member 98 which is specifically designed for matably engaging a junction box such as the junction box 80' wherein the front portion of such junction box is defined by a peripheral lip or edge portion 92 only. The junction box 80' is substantially identical in all respects to the construction of the junction box 80 except that the junction box 80' does not include the tab members 94. Like the frame member 52, the frame member 98 includes two curved segments 100 and two side frame portions 102. The curved segments 100 are substantially similar to the curved segments 53 of frame member 52 and are constructed so as to conform to the curvature of the curved structure into which it will be embedded. The front surface portion of each of the side frame portions 102 may likewise be similarly curved so as to conform to the curvature of the frame segments 100 and each such side frame portion 102 is substantial U-shaped in construction as best illustrated in FIG. 13, the space 104 defined by the U-shaped construction of the side frame portions 102 being sufficiently dimension so as to insertably receive therewithin the front lip 92 and a portion of each of the opposed side wall portions 84 and 86 of junction box 80'.

Figure 13:
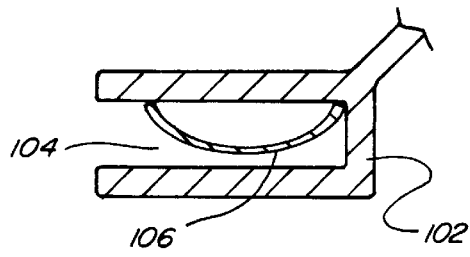
FIG. 13 is a cross-sectional view taken along line 13—13 in FIG. 12.

Each side frame portion 102 further includes spring biasing engagement means 106 extending into the space 104 as best shown in FIG. 13, the biasing means 106 engaging the corresponding side wall portions 84 and 86 of the junction box 80' when said side wall portions are positioned within the space 104. The spring biasing means 106 may take on a wide variety of different configurations including a single biasing means extending the full length of each side frame portion 102; it may include a plurality of spring biasing members 106; and/or it may include spring biasing means projecting into the space 104 from each opposite side of the U-shaped construction, the only requirement being that such spring biasing means sufficiently engage the junction box side wall portions 84 and 86 so as to sufficiently hold the frame member 98 in proper position and engagement with the junction box 80'. It is also anticipated and contemplated that other biasing arrangements may likewise be utilized.

Figure 14:
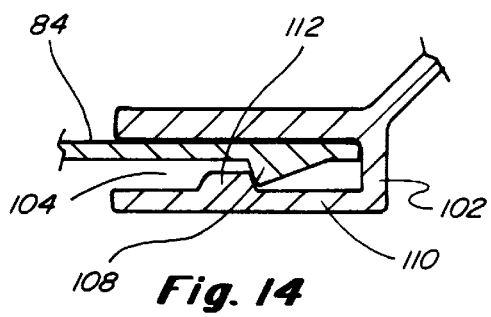
FIG. 14 is a partial cross-sectional view similar to FIG. 13 illustrating another embodiment of cooperatively engageable means for matingly engaging the frame member of FIG. 12 to the junction box illustrated therein.

It is also contemplated that other engagement means such as a snap-lock fitting arrangement may be utilized instead of spring biasing means to sufficiently hold the frame member 98 in engagement with the junction box 80'. In this regard, FIG. 14 illustrates one type of snap-lock arrangement suitable for use with the present invention wherein the opposed side wall portions of the junction box such as the side wall 84 illustrated in FIG. 14 includes an offset portion or projection 108 and one of the arms forming the U-shaped construction of the corresponding side frame portion 102 such as the side arm 110 (FIG. 14) includes a corresponding offset or projection 112. When the junction box side wall 84 is inserted in the space 104, the wall projection 108 will sufficiently deflect side frame arm portion 110 and expand space 104 so as to allow the projection 108 to slip behind the arm projection 112 as shown in FIG. 14 thereby engaging the same and preventing the frame member 98 from being easily disengaged from the junction box 80'. Here again, the snap-lock means 108 and 112 may be fabricated in a wide variety of different configurations such as including a single side wall offset or projection 108 extending the full length of each junction box side wall 84 and 86 along with a corresponding arm projection 112 likewise extending the full length of side frame arm portion 110, or such projections 108 and 112 can be formed into a plurality of projections extending in space apart relationship the full length of the corresponding wall and arm portions 84, 86, and 110. Other snap-lock engagement means are likewise possible.

Still further, it is likewise anticipated and contemplated that the rear portion of each of the two curved segments 100 associated with frame member 98 may likewise be constructed so as to include means cooperatively engageable with the front lip or edge portion 92 associated with the top and bottom wall portions 88 and 90 of the junction box 80' substantially similar to the construction of the side frame portions 102 and the spring biasing means 106 (FIG. 13) or the snap-lock means 108 and 112 (FIG. 14) utilized in conjunction therewith. A face plate member similar to plate members 38 and/or 38' may be thereafter attached to the frame member 98 as previously explained. Encasement of the junction box 80' with the frame member 98 engaged therewith within a cylindrical concret pier or other curved structure will further prevent disengagement of such members from each other. It is also recognized that the junction boxes 80 and 80' along with the various components of the present invention as discussed with respect to FIGS. 11–14 including the frame member 98 may be positioned and retained in its proper location during the forming or casing process in the same manner as discussed with respect to encasement of the junction box assembly 20 illustrated in FIG. 7. Other variations are likewise possible.

It is therefore recognized and anticipated that the present junction box assemblies as illustrated in FIGS. 1–14 may be used in many different types of curved structures including curved structures fabricated from a wide variety of materials other than concrete. It is also anticipated and recognized that the frame members 52, 56 and 98 illustrated in FIGS. 5, 6 and 12–14 may be formed from a single sheet of material pressed into the desired shape thereby further increasing their strength and durability as well as improving the weatherproof and tamperproof capabilities of the present assembly. Still further, it is also important to note that the overall dimensions of any of the present junction box assemblies such as the assembly 20 illustrated in FIG. 1, including the face plate members 38 and 38', as well as the particular configuration of the rear and side walls associated with the housing member are subject to wide variations as previously explained. Although the present junction box assemblies have particular utility and are readily employable in cylindrical concrete piers, such assemblies can likewise be utilized in a multitude of different applications, including use in a wide variety of other curved structures.

Thus, there has been shown and described a novel means for adapting a junction box for ready use in curved structures, which junction box assembly fulfills all of the objects and advantages sought therefor. Many changes, modifications, variations and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. Means for adapting a junction box for mounting within a curved structure wherein said junction box defines an interior space and includes a front wall portion which is substantially open and provides access to the interior space of said junction box, said means comprising a frame member having top, bottom and opposed side portions, said frame member being sized and dimensioned so as to correspond and mate with the front wall portion of said junction box, the top and bottom portions of said frame member each having a front surface portion which is curved so as to conform to the curvature of the outer surface of the curved structure into which said junction box will be mounted, and means for attaching said frame member to the front wall portion of said junction box.

2. The means defined in claim 1 including a face plate member attachable to said frame member for controlling access to the interior space of said junction box, said face plate member being similarly curved so as to conform to the curvature of the top and bottom portions of said frame member, and means for attaching said face plate member to said frame member.

3. The means defined in claim 2 wherein said face plate member includes an access panel to allow access to the interior space within said junction box.

4. The means defined in claim 1 wherein the side portions of said frame member are similarly curved so as to conform to the curvature of the top and bottom portions of said frame member.

5. Means for adapting a junction box for substantially flush mounting within a curved structure, the junction box forming an enclosure and having a peripheral wall defining an interior space within the junction box and a front surface portion defining a front lip substantially surrounding a front opening to permit access to the interior space of the junction box, said means for adapting a junction box comprising an adapter construction configured to be engageable with the junction box and including a protruding peripheral portion which projects forwardly from the front surface portion of the junction box when the adapter construction is engaged with the junction box to define, in conjunction with the peripheral wall of the junction box, an expanded enclosure that includes the interior space of the junction box, said adapter construction having a front portion curved so as to conform to the curvature of the outer surface of the curved structure, and means for maintaining said adapter construction in matable engagement with the junction box.

6. The means defined in claim 5 wherein said adapter construction includes a frame device having outer sides which define a configuration that conforms to the configuration defined by the peripheral wall of the junction box.

7. The means defined in claim 6 wherein the front lip of the junction box includes a flange portion and wherein said adapter construction includes a rear surface configured to abut the flange portion of the junction box, said means for maintaining said adapter construction in engagement with the junction box including means for attaching said frame member to the flange portion of the junction box.

8. The means defined in claim 5 wherein said peripheral portion of said adapter construction includes a pair of curved segment devices each having a front exterior portion curved so as to conform to the curvature of the outer surface of the curved structure and a pair of side framing segments extending between and interconnecting said curved segment devices to define a frame structure, said front exterior portions of said curved segment devices each being part of said front portion of said adapter construction.

9. The means defined in claim 8 wherein said adapter construction is an integral unit.

10. The means defined in claim 5 wherein the front lip of the junction box includes a flange portion and wherein said adapter construction includes a rear surface configured to abut the flange portion of the junction box at at least portions thereof.

11. The means defined in claim 10 wherein said adapter construction is an integral unit including a pair of curved segment portions each having a front exterior portion curved so as to conform to the curvature of the outer surface of the curved structure, said front exterior portions of said curved segment portions each being part of said front portion of said adapter construction.

12. The means defined in claim 10 wherein said adapter construction is a frame member having top, bottom, and opposed side portions, said top and bottom portions each having a front surface portion forming at least a portion of said front portion of said adapter construction, said side portions extending between and interconnecting said top and bottom portions.

13. The means defined in claim 5 wherein said peripheral portion of said adapter construction includes a pair of curved segment portions each having a front exterior portion curved so as to conform to the curvature of the outer surface of the curved structure, said front portion of said adapter construction including said front surface portions of said curved segment portions.

14. The means defined in claim 13 wherein said adapter construction includes an interconnection portion extending between and interconnecting said pair of curved segment portions to space said pair of curved segment portions from one another.

15. The means defined in claim 14 wherein said adapter construction is a unitary construction.

16. The means defined in claim 14 wherein said interconnection portion includes a pair of side frame portions.

17. The means defined in claim 16 wherein said pair of curved segment portions and said pair of side frame portions define an integral member.

18. The means defined in claim 16 wherein said pair of curved segment portions and said pair of side frame portions define a frame assembled from separable component parts.

19. A junction box adapter for adapting a junction box for mounting within a curved structure wherein the junction box defines an interior space and includes a front which is substantially open and provides access to the interior space of the junction box, said junction box adapter comprising a junction box facing member having top, bottom and opposed side portions, said junction box facing member being sized and dimensioned so as to correspond and mate with the junction box, the top and bottom portions of said junction box facing member each having a front surface portion which is curved so as to conform to the curvature of the outer surface of the curved structure into which said junction box will be mounted, and means for attaching said junction box facing member to the junction box.

20. A junction box adapter for adapting a junction box for mounting within a curved structure wherein the junction box defines an interior space and includes a peripheral wall and a front which is substantially open and provides access to the interior space of the junction box, said junction box adapter comprising a junction box facing member having a perimeter portion configured to abut the peripheral wall of the junction box near the front thereof and to mate with the junction box, said junction box facing member having a front surface portion which is curved so as to conform to the curvature of the outer surface of the curved structure into which said junction box will be mounted, and means for attaching said junction box facing member to the junction box.

21. A kit for adapting a junction box having a front wall portion for mounting within a curved structure such that the front of the resulting construction conforms substantially to the curvature of the outer surface of the curved structure, said adapting kit comprising (a) a frame member having top, bottom and opposed side portions, said frame member being sized and dimensioned so as to correspond and mate with the front wall portion of said junction box, the top and bottom portions of said frame member each having a front surface portion which is curved so as to conform to the curvature of the outer surface of the curved structure into which said junction box will be mounted, (b) means for attaching said frame member to the front wall portion of said junction box, (c) a face plate member attachable to said frame member for controlling access to the interior space of said junction box, said face plate member being similarly curved so as to conform to the curvature of the top and bottom portions of said frame member, and (d) means for attaching said face plate member to said frame member.

22. The kit defined in claim 21 including a gasket member, said gasket member being positionable between said face plate member and said frame member when said face plate member is attached thereto.

23. The kit defined in claim 21 wherein said face plate member includes an access panel to allow access to the interior space of said junction box.

* * * * *